(12) United States Patent
Kobayashi et al.

(10) Patent No.: US 7,109,432 B2
(45) Date of Patent: Sep. 19, 2006

(54) ELECTRIC POWER UNIT FOR MACHINING OF WIRE ELECTRIC DISCHARGE MACHINE

(75) Inventors: Hiroatsu Kobayashi, Tokyo (JP); Takuji Magara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 523 days.

(21) Appl. No.: 10/415,749

(22) PCT Filed: Jun. 12, 2002

(86) PCT No.: PCT/JP02/05848

§ 371 (c)(1),
(2), (4) Date: May 2, 2003

(87) PCT Pub. No.: WO03/106088

PCT Pub. Date: Dec. 24, 2003

(65) Prior Publication Data

US 2005/0127041 A1 Jun. 16, 2005

(51) Int. Cl.
*B23H 7/04* (2006.01)
*B23H 7/14* (2006.01)

(52) U.S. Cl. .............................. 219/69.18; 219/69.12; 219/69.13

(58) Field of Classification Search ............. 219/69.13, 219/69.18, 69.19, 69.12
See application file for complete search history.

(56) References Cited

U.S. PATENT DOCUMENTS

| | | | | | |
|---|---|---|---|---|---|
| 5,416,290 | A | * | 5/1995 | Magara et al. ............ | 219/69.18 |
| 5,919,381 | A | * | 7/1999 | Goto et al. ............... | 219/69.18 |
| 5,986,232 | A | * | 11/1999 | Kaneko et al. ........... | 219/69.18 |
| 6,140,600 | A | * | 10/2000 | Kaneko et al. ........... | 219/69.13 |
| 6,727,455 | B1 | * | 4/2004 | Ukai et al. ............... | 219/69.18 |

FOREIGN PATENT DOCUMENTS

| | | |
|---|---|---|
| JP | 2-19012 | 3/1991 |
| JP | 8-1438 | 1/1996 |
| JP | 9-183019 | 7/1997 |

OTHER PUBLICATIONS

Patent abstract of Japan—59-196124—Jul. 11, 1984.

* cited by examiner

*Primary Examiner*—Geoffrey S. Evans
(74) *Attorney, Agent, or Firm*—Sughrue Mion, PLLC

(57) ABSTRACT

The electric power unit for machining of a wire electric discharge machine includes an electric discharge state discriminate or (1*a*) for discriminating a state of electric discharge generated between the electrodes and an impression voltage selecting means (1*b*) for inverting the polarity of the electric discharge inductive pulse voltage from the previous electric discharge inductive pulse voltage when an electric discharge state between the electrodes is discriminated to be abnormal (Y1) or open (Y3) and for making the polarity of the electric discharge inductive pulse voltage to be the same as the polarity of the previous electric discharge inductive pulse voltage when the electric discharge state between the electrodes is discriminated to be normal (Y2).

4 Claims, 7 Drawing Sheets

ELECTRIC POWER UNIT FOR MACHINING OF WIRE ELECTRIC DISCHARGE MACHINE

TECHNICAL FIELD

The present invention relates to improvements in an electric power unit for machining used for a wire electric discharge machine to conduct machining on a workpiece by electric discharge generated between a wire electrode and workpiece.

BACKGROUND ART

In wire electric discharge machining, an insulating machining solution is interposed between a wire electrode and workpiece. While the wire electrode and workpiece are being moved relatively with each other, electric power for machining is supplied from an electric power unit for machining to between the wire electrode and workpiece, so that the workpiece is machined by electric discharge energy.

Electric power units of the above conventional wire electric discharge machine used for wire electric discharge machining are disclosed, for example, in Japanese Unexamined Patent Publication Nos. 8-1438, 8-300222, 9-183019 and 7-290317. In the above electric power units for machining of the conventional wire electric discharge machine, a bipolar electric discharge inductive voltage is impressed upon between the wire electrode and workpiece so as to generate electric discharge, and then a main electric discharge current for machining is superimposed so as to conduct electric discharge. While importance is put only on the object of preventing the occurrence of electrolytic corrosion of the workpiece, the polarity is changed over to improve deviation of the polarity of electric discharge inductive voltage.

In the electric power unit for machining of the above conventional wire electric discharge machine, in order to improve deviation of the polarity, the polarity of bipolar voltage is changed over. Therefore, in the case of an abnormal state of electric discharge between the electrodes such as an abnormal state of concentrated electric discharge, it is necessary to reduce the speed of feeding the workpiece to be machined, or it is necessary to stop the feed of the workpiece, or it is necessary to retract the workpiece. Alternatively, it is necessary to increase the quiescent time of an impression voltage pulse. Therefore the electric discharge machining efficiency is lowered. Further, there is provided no means for continuing electric discharge in the case of normal electric discharge between the electrodes. Therefore, it is impossible to conduct electric discharge machining effectively.

Japanese Examined Patent Publication No. 3-119012 discloses an electric power unit for machining in which electric discharge is conducted as follows. In the case where an abnormal state of electric discharge is detected between the electrodes, electric discharge of reverse polarity is conducted while the workpiece is used as a negative electrode and the wire electrode is used as a positive electrode. In the case where a normal state of electric discharge is detected between the electrodes, electric discharge of straight polarity is conducted while the workpiece is used as a positive electrode and the wire electrode is used as a negative electrode. Whenever the case of an abnormal state of electric discharge, electric discharge machining of reverse polarity is conducted, so that the electric discharge machining speed is increased by utilizing electrolytic action of a machining solution.

In the electric power unit for machining of the above conventional wire electric discharge machine, the following problems may be encountered. In the case where an abnormal state of electric discharge between the electrodes is detected, electric discharge of reverse polarity is conducted. This abnormal state of electric discharge occurs in the case where the wire electrode and workpiece are short-circuited to each other or in the case of concentrated electric discharge. In the case of the occurrence of short circuit, even if voltage is impressed upon between the wire electrode and workpiece, no electric potential difference is generated. Therefore, no electrolytic action occurs. In the case of the occurrence of concentrated electric discharge, even if voltage is impressed upon between the electrodes, the electric potential difference is so small that an electrolytic action of the machining solution is not strong. Accordingly, even if the electrolytic action of the machining solution is utilized, the machining speed can not be increased sufficiently high. Further, it is difficult to early recover from the above abnormal state of electric discharge. Therefore, it is necessary to reduce the speed of feeding the workpiece to be machined, or it is necessary to stop the feed of the workpiece, or it is necessary to retract the workpiece. Alternatively, it is necessary to increase the quiescent time of an impression voltage pulse. Therefore the electric discharge machining efficiency is lowered.

DISCLOSURE OF THE INVENTION

The present invention has been accomplished to solve the above problems. It is an object of the present invention to provide an electric power unit for machining of a wire electric discharge machine capable of enhancing the efficiency of electric discharge machining.

The present invention provides an electric power unit for machining of a wire electric discharge machine for machining a workpiece in which an electric discharge inductive pulse voltage is impressed upon between electrodes of a wire electrode and workpiece, after insulation between the electrodes has been broken by the pulse voltage and electric discharge has been induced, a pulse voltage for machining is impressed upon between the electrodes so as to conduct machining on the workpiece, the electric power unit for machining of a wire electric discharge machine comprising: an electric discharge state discriminating means for discriminating a state of electric discharge generated between the electrodes; and an impression voltage selecting means for inverting the polarity of the electric discharge inductive pulse voltage from the previous electric discharge inductive pulse voltage in the case where an electric discharge state between the electrodes is discriminated to be abnormal or open by the electric discharge state discriminating means and for making the polarity of the electric discharge inductive pulse voltage to be the same as the polarity of the previous electric discharge inductive pulse voltage in the case where the electric discharge state between the electrodes is discriminated to be normal by the electric discharge state discriminating means.

The present invention also provides an electric power unit for machining of a wire electric discharge machine, further comprising: a machining electric power unit control means for impressing the pulse voltage for machining upon between the electrodes and for stopping the impression of the pulse voltage for inducing electric discharge in the case where a state of electric discharge between the electrodes is discriminated to be normal and abnormal by the electric discharge state discriminating means.

The present invention also provides an electric power unit for machining of a wire electric discharge machine, further comprising: a machining electric power unit control means for supplying the pulse voltage for machining to between the electrodes in the case where a state of electric discharge between the electrodes is discriminated to be normal by the electric discharge state discriminating means so as to stop the impression of the pulse voltage for inducing electric discharge.

The present invention also provides an electric power unit for machining of a wire electric discharge machine, further comprising: an average voltage detection means for detecting an average voltage between the electrodes; and a machining electric power unit control means for controlling the maximum time of impression of the pulse voltage for inducing electric discharge so that deviation of the average voltage between the electrodes, which has been detected by the average voltage detection means, can be suppressed.

Since the electric power unit for machining of a wire electric discharge machine of the present invention is composed as described above, it is possible to provide the following effects. The machining efficiency can be enhanced, and the machining speed can be enhanced. Further, it is possible to prevent the occurrence of electrolytic corrosion of a workpiece.

BEST MODE FOR CARRYING OUT THE INVENTION

EMBODIMENT 1

Figure 1:
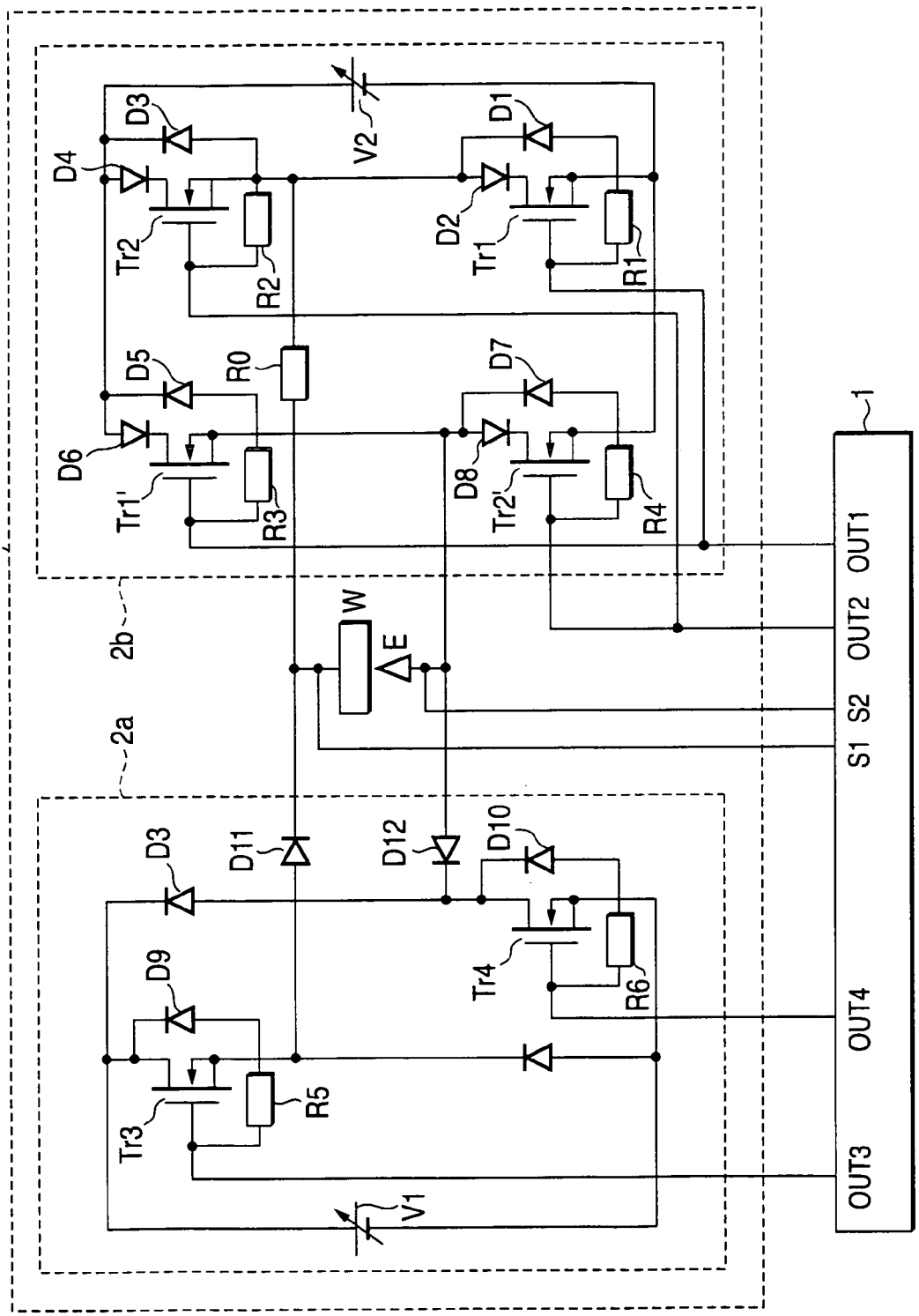
FIG. 1 is an arrangement view showing an electric power unit for machining of a wire electric discharge machine of Embodiment 1 of the present invention.

FIG. 1 is an arrangement view showing an electric power unit for machining of a wire electric discharge machine of Embodiment 1 of the present invention. In the drawing, reference numeral 1 is a machining electric power unit control circuit, reference numeral 2 is an electric power unit for machining, reference numeral 2a is a main electric discharge circuit, reference numeral 2b is an electric discharge inductive circuit, reference marks Tr1 and Tr1' are switching elements turned on and off by drive signal OUT1 output from the machining electric power unit control circuit 1, reference marks Tr2 and Tr2' are switching elements turned on and off by drive signal OUT2 output from the machining electric power unit control circuit 1, reference mark Tr3 is a switching element turned on and off by drive signal OUT3 output from the machining electric power unit control circuit 1, reference mark Tr4 is a switching element turned on and off by drive signal OUT4 output from the machining electric power unit control circuit 1, reference marks V1 and V2 are electric power sources of DC, reference marks R0, R1 to R6 are resistors, reference marks D1 to D12 are diodes, reference marks S1 and S2 are detection input terminals, reference mark E is a wire electrode, and reference mark W is a workpiece.

The electric discharge inductive circuit 2b is a circuit for inducing electric discharge between electrodes, and the main electric discharge circuit 2a is a circuit for supplying a main electric discharge current used for conducting electric discharge machining. When electric discharge induction is detected after electric discharge inductive voltage has been impressed by the electric discharge inductive circuit 2b, the impression of electric discharge inductive voltage by the electric discharge inductive circuit 2b is stopped, and the main electric discharge current is made to flow between the electrodes by the main electric discharge circuit 2a, so that the workpiece is machined by electric discharge machining. The main electric discharge circuit 2a and the electric discharge inductive circuit 2b are driven by signals sent from the machining electric power unit control circuit 1.

In the arrangement shown in FIG. 1, the polarity of the main electric discharge power unit is the positive polarity, however, it should be noted that the polarity of the main electric discharge power unit is not limited to the positive polarity. According to the electric discharge machining to be conducted, it is possible to employ an arrangement in which the polarity of the main electric discharge power unit is the reverse polarity.

Figure 2:
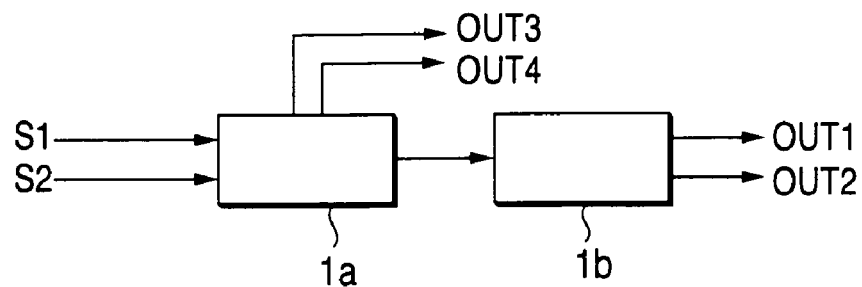
FIG. 2 is an arrangement view showing a machining electric power unit control circuit 1 of controlling an electric power unit for machining of a wire electric discharge machine of Embodiment 1 of the present invention.

FIG. 2 is an arrangement view showing a machining electric power unit control circuit 1 of controlling an electric power unit for machining of a wire electric discharge machine of Embodiment 1 of the present invention. Like reference characters are used to indicate like parts in FIGS. 1 and 2. In FIG. 2, reference numeral 1a is an electric discharge state discriminating circuit, and reference numeral 1b is an impressed voltage selecting circuit. Voltage between the electrodes of workpiece W and wire electrode E are input into the machining electric power unit control circuit 1 through defection input terminals S1 and S2, so that electric discharge is detected. According to the electric discharge detection signal, the electric discharging state discrimination circuit 1a outputs drive signals OUT3 and OUT4 into the main electric discharge circuit 2a. The impressed voltage selecting circuit 1b outputs either drive signal OUT1 or OUT2 to the electric discharge inductive circuit 2b.

Figure 3:
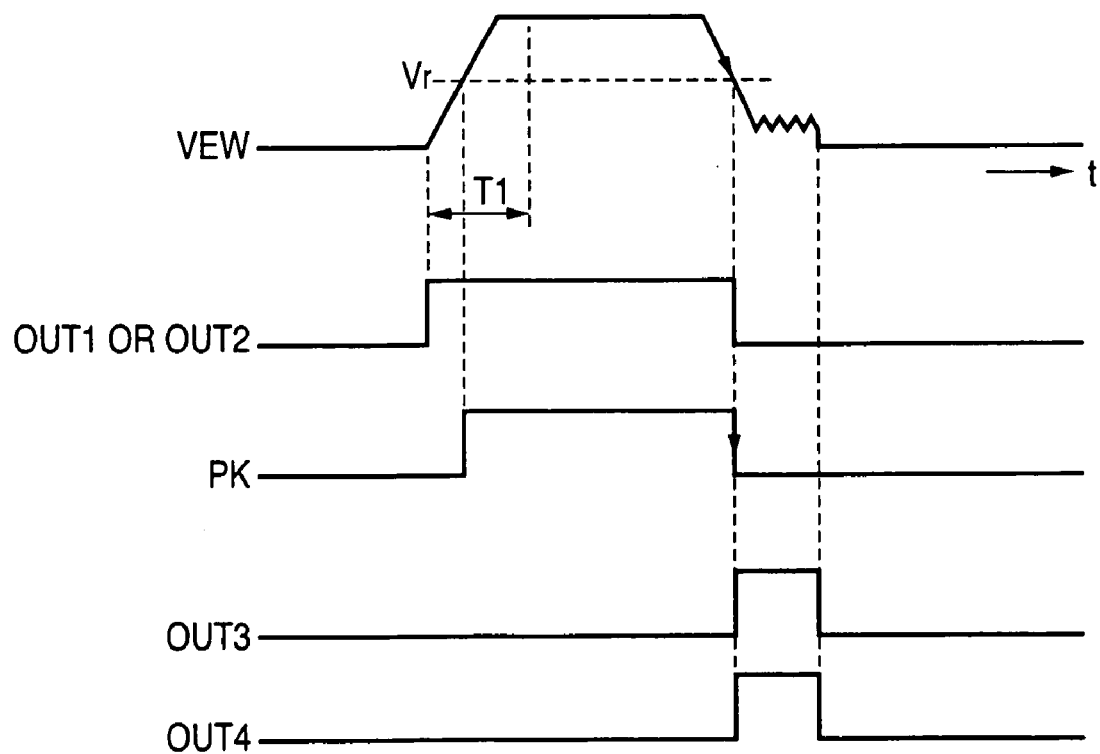
FIG. 3 is a view showing an example of a wave-form of voltage impressed between electrodes by an electric power unit for machining of a wire electric discharge machine of Embodiment 1 of the present invention.

FIG. 3 is a view showing an example of a wave-form of voltage impressed between electrodes by an electric power unit for machining of a wire electric discharge machine of Embodiment 1 of the present invention. Like reference characters are used to indicate like parts in FIGS. 1, 2 and 3. In FIG. 3, reference mark VEW is a voltage impressed between the electrodes, reference mark Vr is a reference voltage, reference mark T1 is a predetermined period of time in which voltage VEW impressed between the electrodes rises higher than reference voltage Vr from the start of impression of voltage in the case of normal electric discharge, reference mark PK is a pulse signal, and reference mark t is time.

Figure 4:
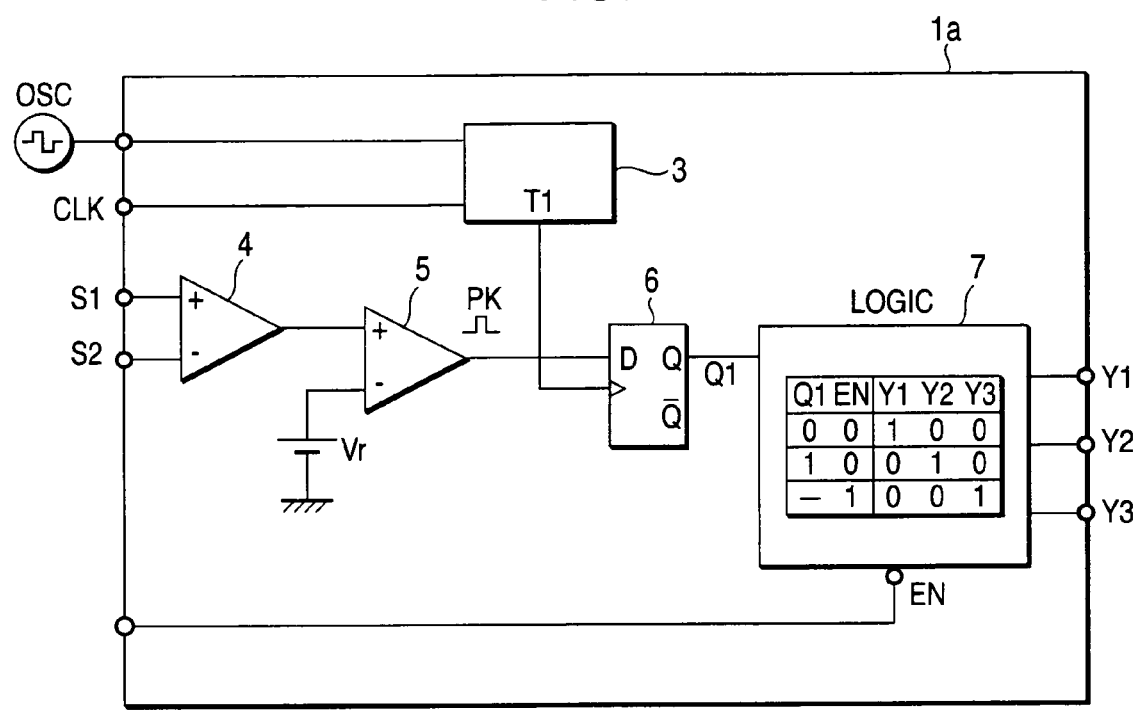
FIG. 4 is an arrangement view showing an electric discharge state discriminating circuit 1a shown in FIG. 2.

FIG. 4 is an arrangement view showing an electric discharge state discriminating circuit 1a shown in FIG. 2. Like reference characters are used to indicate like parts in FIGS. 1, 2 and 3. In FIG. 4, reference numeral 3 is a counter, reference numeral 4 is an amplifier for amplifying signals input from detection input terminals S1 and S2, reference numeral 5 is a comparator for comparing an output of the amplifier 4 with reference voltage Vr, reference numeral 6 is a D flip-flop, reference numeral 7 is a logical operation circuit, reference mark OSC is an oscillator, reference mark CLK is a reference clock, and reference mark EN is a pulse completion signal. Pulse completion signal EN is output at the point of time of completion of a pulse, that is, pulse completion signal EN is output at the point of time when it has passed through the electric discharge inductive voltage impression maximum time.

Next, operation will be explained below. In FIG. 1, when switching elements Tr1 and Tr1' or switching elements Tr2 and Tr2' are turned on by drive signal OUT1 or OUT2 of the machining electric power unit control circuit 1, voltage of DC electric power unit V2 appears between the electrodes of wire electrode E and workpiece W via resistor R0. For example, the wave-form of voltage impressed between the electrodes shown in FIG. 3 is output. At this time, in the electric discharge state discriminating circuit 1a shown in FIG. 4, the amplifier 4 detects voltage VEW impressed between the electrodes which are impressed upon detection input terminals S1 and S2. The comparator 5 compares the result of detection with reference voltage Vr and outputs pulse signal PK. A wave-form of this pulse signal PK is shown in FIG. 3.

In FIG. 4, the counter 3 conducts counting operation, for example, by the clock frequency of 10 MHz. A trigger signal is output after predetermined period of time T1 has passed from when oscillator OSC output an ON-signal to switching elements Tr1 and Tr1' or switching elements Tr2 and Tr2' in FIG. 1. D flip-flop 6 outputs a state of pulse signal PK, which is an output of the comparator 5 at the point of time of predetermined period of time T1, as signal Q1. In the logical operation circuit 7, it is judged whether or not voltage VEW impressed between the electrodes rises to reference voltage Vr at the point of time of predetermined time T1, and a state of electric discharge between the electrodes of wire electrode E and workpiece W is discriminated.

For example, the judgment is made as follows. In the case where voltage VEW impressed between electrodes does not rise to reference voltage Vr at the point of time of predetermined time T1, it is judged that the electric discharge state between the electrodes is abnormal (Y1). In the case where voltage VEW impressed between the electrodes rises to reference voltage Vr at the point of time of predetermined time T1 and drops to a value not higher than reference voltage Vr after that, it is judged that electric discharge has been stably conducted in a sufficient period of time. Therefore, the state of electric discharge between the electrodes is judged to be normal (Y2).

When abnormal electric discharge (Y1) or normal electric discharge (Y2) is detected, switching elements Tr3 and Tr4 of the main electric discharge circuit 2a are turned on while drive signals OUT3 and OUT4 are being used as "High", and switching elements Tr1, Tr1', Tr2, Tr2' are turned off while drive signals OUT1 and OUT2 are being used as "Low". In the case where no electric discharge is generated, the machining electric power unit control circuit 1 turns on switching elements Tr1 and Tr1' or switching elements Tr2 and Tr2' only at the electric discharge inductive voltage impression maximum time. After the electric discharge inductive voltage impression maximum time has passed, pulse completion signal EN is output. In this case, it is judged that the electrodes are open (Y3).

The above explanations are made into a case in which switching elements Tr3 and Tr4 are turned on while drive signals OUT3 and OUT4 are being used as "High" in the case of detecting abnormal electric discharge (Y1) or in the case of detecting normal electric discharge (Y2). However, depending upon machining, switching elements Tr3 and Tr4 may be turned on while drive signals OUT3 and OUT4 are being used as "High" only in the case of detecting normal electric discharge. Even in this case, both drive signals OUT1 and OUT2 are used as "Low".

As described above, by the electric discharge state discriminating circuit 1a, it is possible to discriminate abnormal electric discharge (Y1), normal electric discharge (Y2) and open (Y3) between the electrodes. According to the result of the discrimination, the polarity of voltage to be impressed next is selected by the impressed voltage selecting circuit 1b. In the case where a state between the electrodes is discriminated to be abnormal electric discharge (Y1) or open (Y3), electric discharge inductive voltage, the polarity of which is inverted from the polarity of the previous electric discharge inductive voltage, is impressed. In the case where a state between the electrodes is discriminated to be normal electric discharge (Y2), electric discharge inductive voltage, the polarity of which is the same as the polarity of the previous electric discharge inductive voltage, is impressed.

Figure 5:
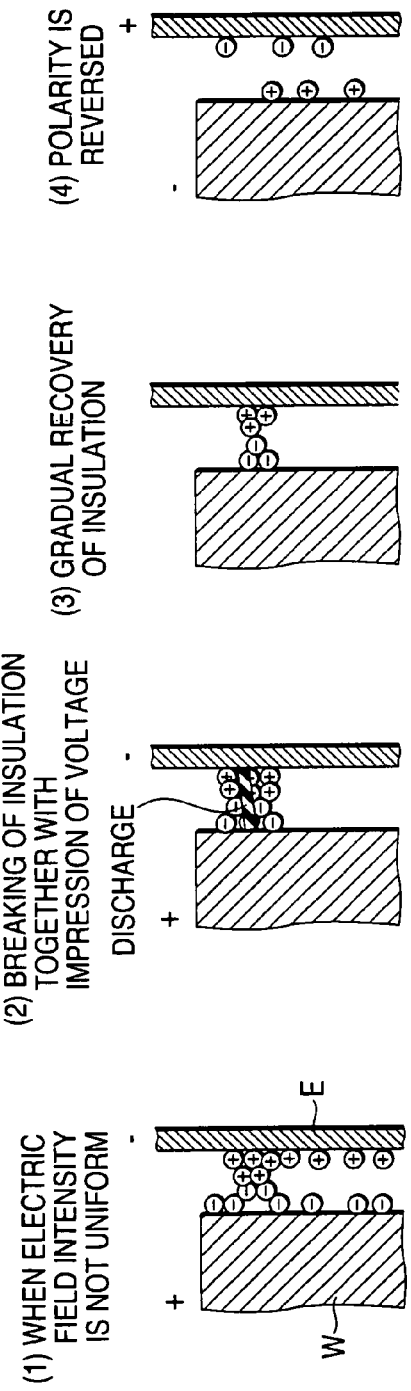
FIG. 5 is a schematic illustration showing a cycle of electric discharge machining.
Figure 5:
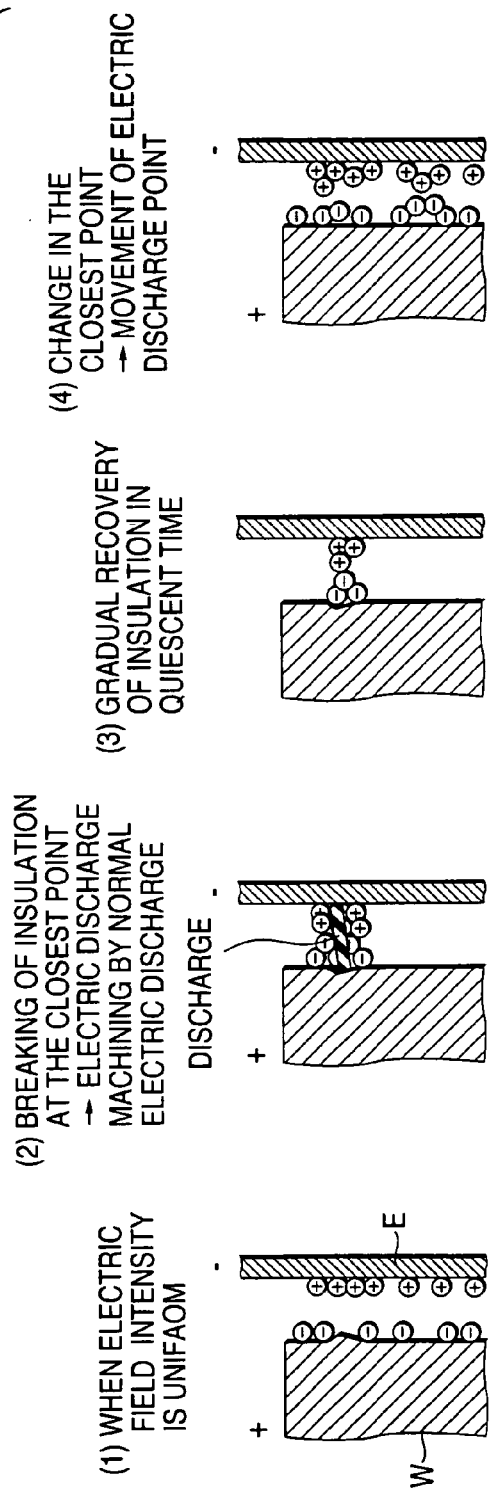

A cycle of electric discharge machining is "Breaking of insulation between the electrodes"→"Generation of electric discharge"→"Melting, removing, cooling of a portion of electric discharge"→"Recovery of insulation between the electrode". When the above cycle is repeated, electric discharge machining proceeds. FIG. 5 is a schematic illustration showing a cycle of electric discharge machining. FIG. 5(a) is view showing a case of abnormal electric discharge, and FIG. 5(b) is view showing a case of normal electric discharge.

Figure 6:
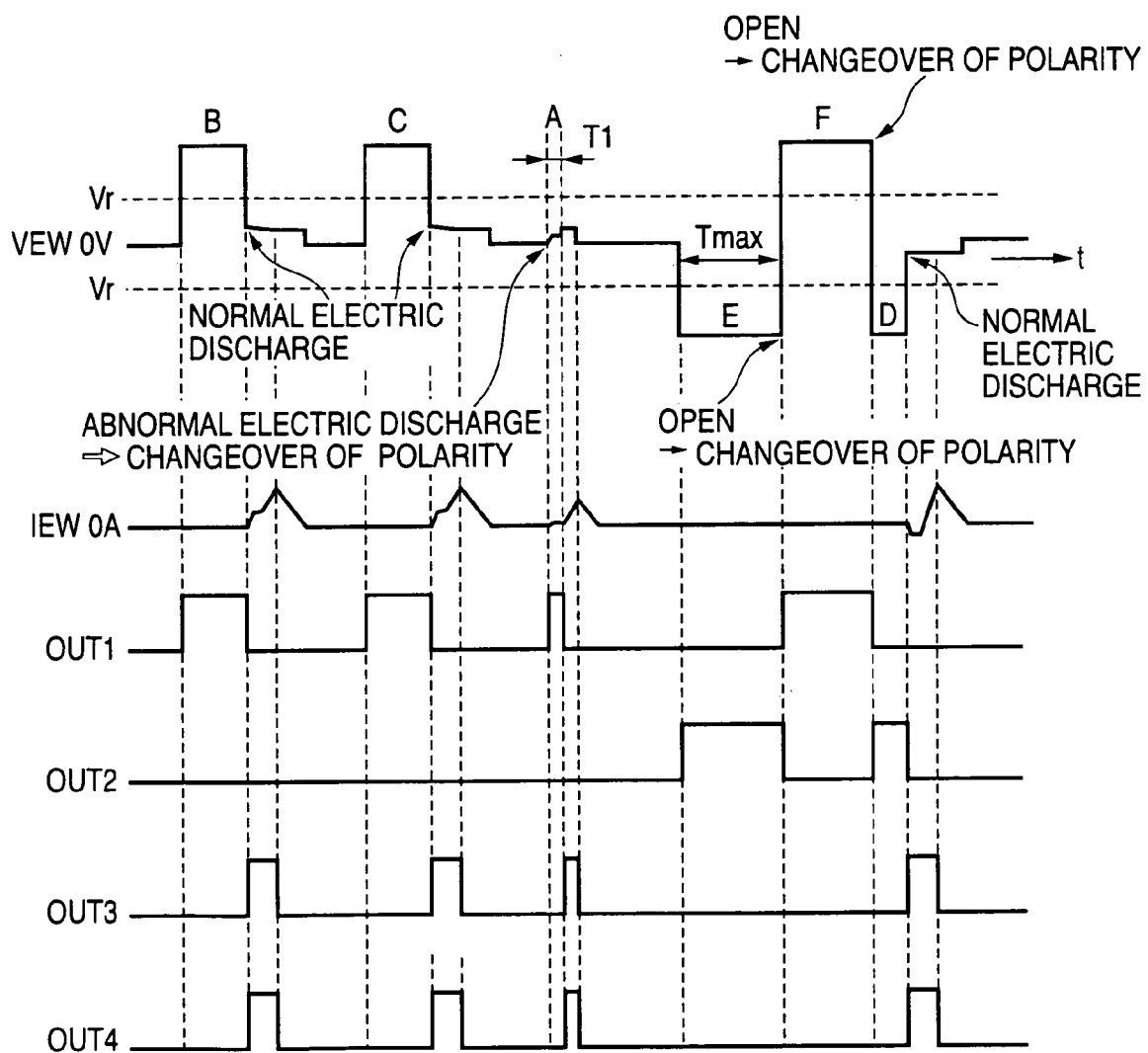
FIG. 6 is a schematic illustration showing an example of voltage impressed between electrodes and current flowing between the electrodes in an electric power unit for machining of a wire electric discharge machine of Embodiment 1 of the present invention.

FIG. 6 is a schematic illustration showing an example of voltage impressed between electrodes and also showing an electric current flowing between the electrodes in an electric power unit for machining of a wire electric discharge machine of Embodiment 1 of the present invention. Like reference characters are used to indicate like parts in FIGS. 1 to 4. In FIG. 6, IEW is an electric current between the electrodes, and Tmax is an electric discharge inductive voltage impression maximum time.

In the case of abnormal electric discharge shown in FIG. 5(a), when electric field intensity between the electrodes is not uniform as shown in the state (1), by the impression of an electric discharge inductive voltage, electric discharge is induced at a position where electric field intensity is the lowest as shown in the state (2), and insulation between the electrodes is gradually recovered in the quiescent time as shown in the state (3). However, in the case where the quiescent time to be inserted is short, insulation can not be recovered like the state (3), and electric field intensity remains to be not uniform, and electric discharge is generated at the same position simultaneously with the impression of the next electric discharge inductive voltage, and the states (2) and (3) are repeated. When this repetition is caused, electric field intensity further becomes not uniform, and the state becomes similar to short circuit, that is, the state becomes an electric discharge state, which does not contribute to electric discharge machining, and further breaking of wire electrode E tends to occur. However, in this case, when the electric discharge inductive voltage, the polarity of which is reverse to the polarity of the previous abnormal electric discharge, is impressed as shown in the state (4), that is, when A of voltage VEW between the electrodes shown in FIG. 6 is impressed, the ionization state between the electrodes can be once reset. Therefore, it is possible to early solve the problem of being not uniform of electric field intensity between the electrodes. Accordingly, it becomes possible to suppress the occurrence of concentrated electric discharge and early recover to normal electric discharge. As a result, the machining efficiency can be enhanced and breaking of the wire electrode can be suppressed at the same time.

On the other hand, according to the method disclosed in Japanese Examined Patent Publication No. 3-119012, which is the prior art, electric discharge machining of reverse polarity is always conducted in the case of abnormal electric discharge. Therefore, it is impossible to recover insulation early. Because of continuation of abnormal electric discharge, normal electric discharge is seldom conducted, and it becomes impossible to effectively conduct electric discharge machining. Therefore, the machining efficiency of the prior art is deteriorated as compared with the machining efficiency of the present invention.

Figure 7:
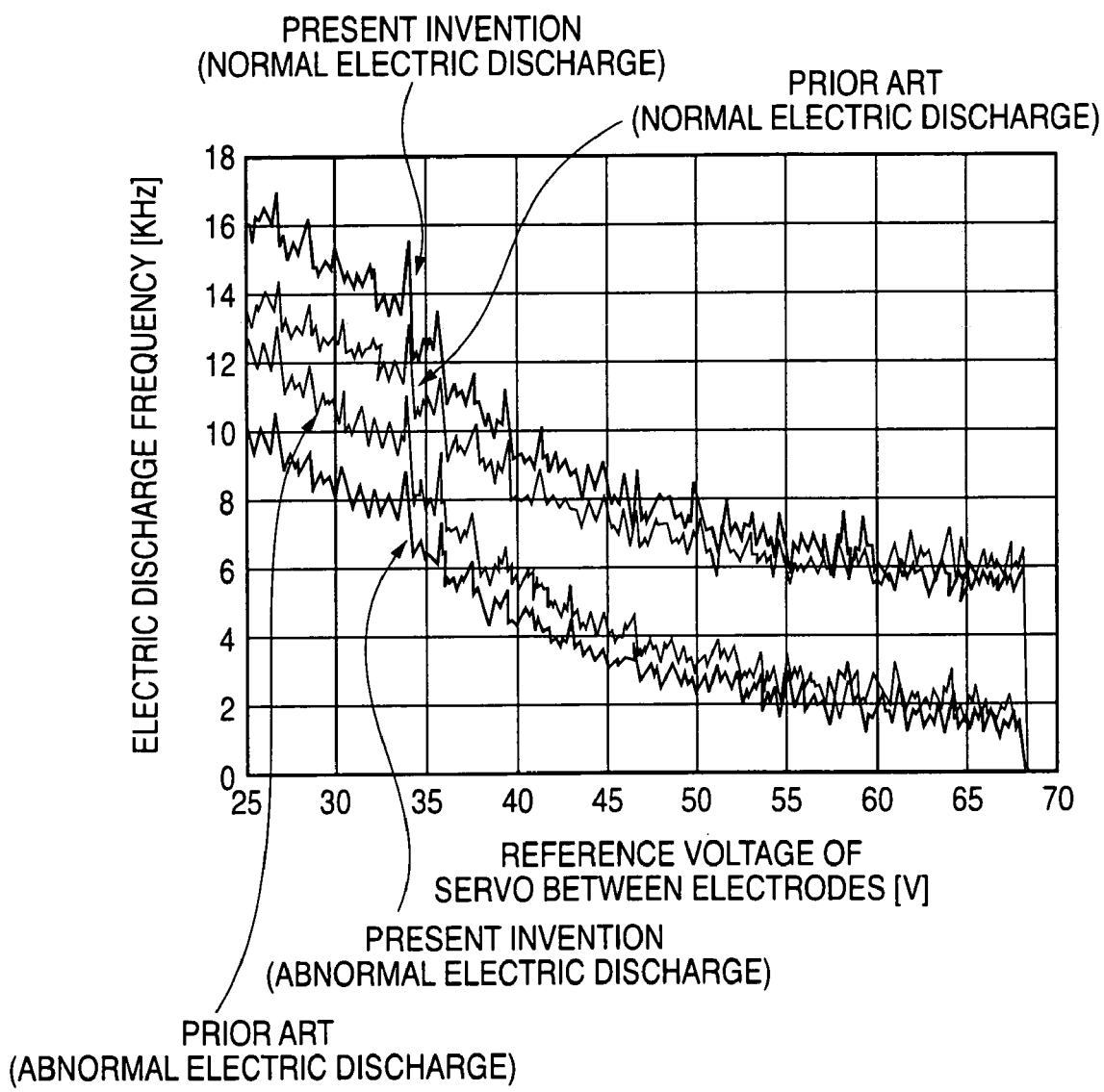
FIG. 7 is a view showing a result of an experiment in which an electric power unit for machining of a wire electric discharge machine of Embodiment 1 of the present invention is compared with an electric power unit for machining of a wire electric discharge machine of the prior art.
Figure 8:
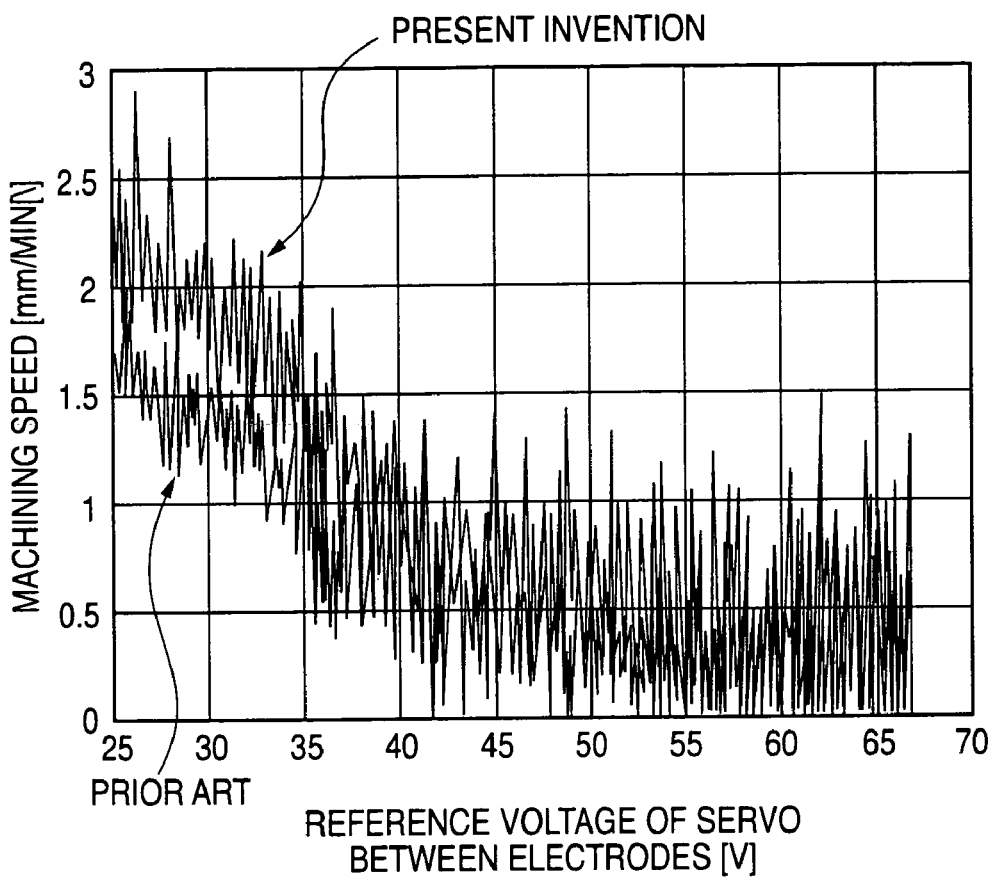
FIG. 8 is a view showing a result of an experiment in which an electric power unit for machining of a wire electric discharge machine of Embodiment 1 of the present invention is compared with an electric power unit for machining of a wire electric discharge machine of the prior art.

FIGS. 7 and 8 are views showing the results of experiments in which the electric power unit for machining of the wire electric discharge machine of Embodiment 1 of the present invention is compared with the electric power unit for machining of the wire electric discharge machine disclosed in Japanese Examined Patent Publication No. 3-119012 which is the prior art. FIG. 7 is a view showing a change in the electric discharge frequency by the reference voltage of servo between the electrodes, and FIG. 8 is a view showing a change in the machining speed by the reference voltage of servo between the electrodes.

In the cases shown in FIGS. 7 and 8, the following can be understood. In the case where the reference voltage of servo between electrodes is high, since a state between the electrodes is close to an open state, normal electric discharge is caused more frequently than abnormal electric discharge. Therefore, a difference between the electric discharge frequency of the present invention and that of the prior art is small, and a difference between the machining speed of the present invention and that of the prior art is also small. However, in the case where the reference voltage of servo between electrodes is low, since a distance between electrodes becomes small, an electric discharge state between the electrodes tends to be abnormal. Therefore, a difference between the electric discharge frequency of the present invention and that of the prior art is large, and a difference between the machining speed of the present invention and that of the prior art is also large. Therefore, abnormal electric discharge is less frequently caused in the present invention than the prior art and the machining efficiency is higher. Accordingly, the machining speed can be enhanced.

In the case of normal electric discharge shown in FIG. 5(b), the electric field intensity is uniform as shown in the state (1). Therefore, electric discharge is caused at a position where the distance between electrodes is the smallest as shown in the state (2). This case is different from a case of abnormal electric discharge (short circuit or concentrated electric discharge). That is, since a sufficiently high intensity of electric discharge energy is input into the point of electric discharge in this case, electric discharge machining can be sufficiently conducted on workpiece W as shown in the state (2), and the point at which workpiece W and wire electrode E come closest to each other is moved to another point as shown in the state (4). Even in this case, insulation between the electrodes is recovered in the quiescent time of an impression voltage pulse as shown in the state (3). However, in this case, since the point at which workpiece W and wire electrode E come closest to each other is moved to another point, even if the polarity of electric discharge inductive voltage is not inverted, which is unlike the case of abnormal electric discharge, the probability of generation of electric discharge at the same point is decreased. Therefore, it is unnecessary to invert the polarity of electric discharge inductive voltage. In the case where the polarity of electric discharge inductive voltage is inverted, the state between the electrodes is once reset by this inverted voltage. Accordingly, a period of time necessary for generating electric discharge by electric discharge inductive voltage is extended, and a period of electric discharge is extended. As a result, the electric discharge machining efficiency is lowered. Accordingly, when the output polarity of a voltage pulse is not changed over (B, C and D of voltage VEW between electrodes in FIG. 6), the electric discharge inductive state can be maintained to be the most appropriate. Accordingly, electric discharge machining can be effectively conducted on the workpiece.

In the case where electric discharge is being generated, the polarity is selected so that the electric discharge machining efficiency can be enhanced according to the result of discrimination of the state of electric discharge between the electrodes. Therefore, a period of time from the impression of electric discharge inductive voltage to the start of electric discharge changes by the state of electric discharge between the electrodes. Accordingly, when the individual electric discharge operation is compared with each other, a difference is caused in the period of time in which electric discharge inductive voltage is impressed. However, since the absolute values of electric discharge inductive voltage are the same and the fluctuation of impression time is negligible when it is averaged, it is possible to assume that the averaged voltage between the electrodes is substantially 0 V. Therefore, no problems of electrolytic corrosion are caused even when electric discharge inductive voltage is impressed.

In the case where electric discharge induction is not detected, that is, in the case where it is judged that a state between electrodes is open (E and F of voltage VEW between electrodes in FIG. 6), a workpiece is subjected to electrolytic corrosion by the electrolytic action of a machining solution when electric discharge inductive voltage of the same polarity is being continuously impressed. However, when the impression polarity of electric discharge inductive voltage is inverted, the occurrence of electrolytic corrosion of a workpiece can be prevented even while electric discharge is not being conducted on a workpiece.

EMBODIMENT 2

Figure 9:
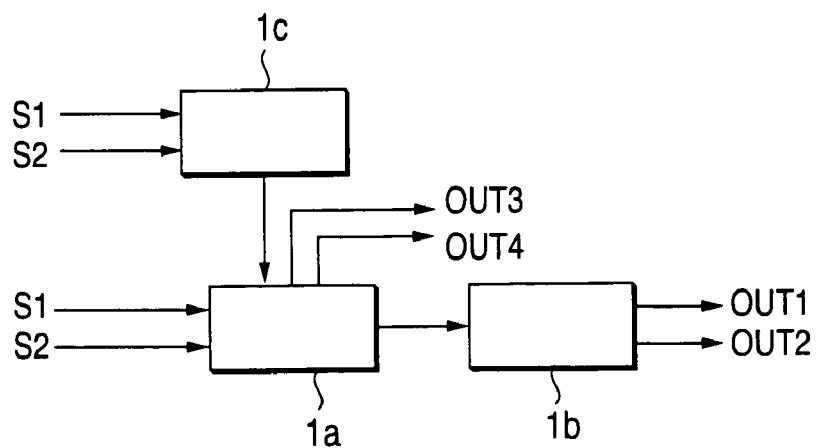
FIG. 9 is an arrangement view showing a machining electric power unit control circuit 1 of controlling an electric power unit for machining of a wire electric discharge machine of Embodiment 2 of the present invention.

FIG. 9 is an arrangement view showing a machining electric power unit control circuit 1 of controlling an electric power unit for machining of a wire electric discharge machine of Embodiment 2 of the present invention. Like reference characters are used to indicate like parts in FIG. 2 showing Embodiment 1 and FIG. 9 showing Embodiment 2.

In FIG. 9, reference numeral 1c is a detection circuit for detecting an average voltage between electrodes.

The machining electric power control unit 1 includes a detection circuit 1c for detecting an average voltage between electrodes. The maximum time of electric discharge inductive voltage impression is controlled according to an output signal sent from the detection unit 1c for detecting an average voltage between electrodes. For example, in the case where the average voltage between electrodes is biased toward the positive side, the detection circuit 1c for detecting an average voltage between electrodes outputs "High", and in the case where the average voltage between electrodes is biased toward the negative side, the detection circuit 1c for detecting an average voltage between electrodes outputs "Low". In the case where the output of the detection circuit 1c for detecting an average voltage between electrodes is "High", the maximum time of electric discharge inductive voltage impression on the positive side is decreased or the maximum time of electric discharge inductive voltage impression on the negative side is increased. In the case where the output of the detection circuit 1c for detecting an average voltage between electrodes is "Low", the maximum time of electric discharge inductive voltage impression on the positive side is increased or the maximum time of electric discharge inductive voltage impression on the negative side is decreased.

As described above, when the maximum time of electric discharge inductive voltage impression is controlled and workpiece W and wire electrode E are combined with each other, even in the case where electric discharge tends to be caused in either polarity of electric discharge inductive voltage, it is possible to suppress the average voltage between the electrodes from being biased toward either polarity. Therefore, the occurrence of electrolytic corrosion can be prevented.

To control the maximum time of electric discharge inductive voltage impression of either polarity may be arbitrarily determined. Alternatively, the polarity in which the frequency of detection of an open state is high may be detected, and the polarity side on which the frequency of detection is high may be automatically recognized, and the maximum time of electric discharge inductive voltage impression on this polarity side may be controlled.

INDUSTRIAL APPLICABILITY

As described above, the electric power unit for machining of the wire electric discharge machine of the present invention is appropriately used for wire electric discharge machining of high productivity.

The invention claimed is:

1. An electric power unit for machining of a wire electric discharge machine for machining a workpiece in which an electric discharge inductive pulse voltage is impressed upon between electrodes of a wire electrode and workpiece, after insulation between the electrodes has been broken by the pulse voltage and electric discharge has been induced, a pulse voltage for machining is impressed upon between the electrodes so as to conduct machining on the workpiece, the electric power unit for machining of a wire electric discharge machine comprising:

an electric discharge state discriminating means for discriminating a state of electric discharge generated between the electrodes; and an impression voltage selecting means for inverting the polarity of the electric discharge inductive pulse voltage from the previous electric discharge inductive pulse voltage in the case where an electric discharge state between the electrodes is discriminated to be abnormal or open by the electric discharge state discriminating means and for making the polarity of the electric discharge inductive pulse voltage to be the same as the polarity of the previous electric discharge inductive pulse voltage in the case where the electric discharge state between the electrodes is discriminated to be normal by the electric discharge state discriminating means.

2. An electric power unit for machining of a wire electric discharge machine according to claim 1, further comprising: an electric power unit control means for impressing the pulse voltage for machining upon between the electrodes and for stopping the impression of the pulse voltage for inducing electric discharge in the case where a state of electric discharge between the electrodes is discriminated to be normal and abnormal by the electric discharge state discriminating means.

3. An electric power unit for machining of a wire electric discharge machine according to claim 1, further comprising: an electric power unit control means for supplying the pulse voltage for machining to between the electrodes in the case where a state of electric discharge between the electrodes is discriminated to be normal by the electric discharge state discriminating means so as to stop the impression of the pulse voltage for inducing electric discharge.

4. An electric power unit for machining of a wire electric discharge machine according to one of claims 1 to 3, further comprising: an average voltage detection means for detecting an average voltage between the electrodes; and an electric power unit control means for controlling the maximum time of impression of the pulse voltage for inducing electric discharge so that deviation of the average voltage between the electrodes, which has been detected by the average voltage detection means, can be suppressed.

* * * * *